patented Mar. 25, 1952

UNITED STATES PATENT OFFICE 2,590,637

DIRECT HALOGENATION OF STEROIDS WITH AN UNSATURATED SIDE CHAIN IN 17-POSITION AND THE DEHYDROHALOGENATION OF RESULTANT PRODUCTS

Karl Miescher, Riehen, and Ludwig Ehmann and Albert Wettstein, Basel, Switzerland, assignors to Ciba Pharmaceutical Products, Inc., Summit, N. J.

No Drawing. Application August 17, 1950, Serial No. 180,098. In Switzerland August 26, 1949

8 Claims. (Cl. 260—239.55)

The present invention relates to the direct halogenation of steroids which contain an unsaturated side chain in the 17-position. More particularly, the invention is concerned with the direct halogenation of steroids which contain in the 17-position a side chain with at least one double bond of the formula

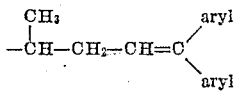

or of the formula

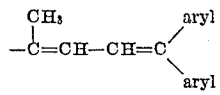

The introduction of a halogen atom into the α-position relative to a double bond in a 17-positioned side chain of a steroid, such as a $\Delta^{22}$-cholene or a $\Delta^{20,23}$-choladiene, has heretofore been effected with the aid of an N-halogenated carboxylic acid imide, amide or arylamide, i. e. in an indirect manner. The primary object of the present invention is to effect such halogenation—more particularly, in the case of the aforedescribed steroids—in a direct and therefore simpler manner. This object is realized, according to the present invention, by directly treating the steroid to be halogenated with a halogen such as chlorine or, preferably, bromine while exposing the reactants to the action of a strong light.

The starting materials can be of any configuration and may be saturated or also unsaturated for example in the positions 4, 5, 7, 11, 14 and/or 16. The steroid nucleus can in addition contain as substituents, for example in 6, 7 and 12- and especially in 3 and 11-position, for example free or functionally converted oxo- or hydroxyl groups, such as acyloxy, for example, acetoxy, propionyloxy, benzoyloxy or tosyloxy groups, alkoxy such as methoxy or ethoxy groups, tetrahydropyranyloxy groups, acetalized oxo groups, epoxy groups for example in 3,9 and 16,17-position, or halogen atoms.

The halogenation is advantageously carried out in a solvent which is inert to, i. e. does not react with, the reactant substances, for example carbon tetrachloride or an aliphatic or alicyclic hydrocarbon, and the reaction solution may to this end be heated. The desired illumination of the reacting materials may be effected by exposing them to any artificial or natural source of strong light. If the starting compounds contain double bonds in the steroid nucleus, these are advantageously temporarily protected by saturation with halogen or, preferably, with hydrogen halide or by conversion into pentacyclic isosteroids in per se conventional manner. Also sensitive substituents, especially free hydroxy groups, are advantageously protected, for example by esterification or etherification.

The halogenated products according to the invention may find use as therapeutics or as intermediates for the preparation of compounds of therapeutic utility. Thus, if desired, hydrogen halide can be split off from the crude or, if preferred, the purified 22-halogen compounds. In many cases, this can be realized by simple heating, for example merely by further boiling of the reaction solution. The dehydrohalogenation can also be effected with the aid of dehydrohalogenating agents, for example reagents such as tertiary amines (pyridine, collidine, quinoline, dimethylaniline or the like).

The following examples illustrate the invention without, however, limiting the scope thereof. In the examples, the parts are by weight unless otherwise stated and the relation between parts by weight and parts by volume is the same as that between the kilogram and liter. The temperatures are in degrees centigrade.

Example 1

29.8 parts of $\Delta^{23}$-3α,12α-diacetoxy-24,24-diphenylcholene are dissolved in 400 parts by volume of pure dry carbon tetrachloride and, with simultaneous exposure to strong light, heated to boiling under a reflux condenser, using a moisture seal. A mixture of 2.55 parts by volume of dry bromine in 50 parts by volume of pure, dry carbon tetrachloride is now run in. In this way the bromine is almost immediately taken up. After boiling for a short time hydrogen bromide is evolved. The reaction mixture is heated for about 4-6 hours further until the evolution of hydrogen bromide has ceased. Thereupon the solvent is evaporated off and the residue dissolved in acetone, whereby the $\Delta^{20,23}$-2α,12α-diacetoxy-24,24-diphenyl-choladiene crystallizes out. The purified diene-dicetate of the formula

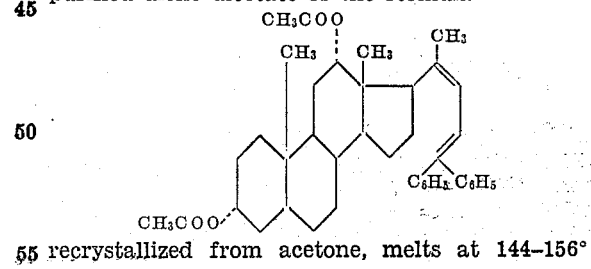

recrystallized from acetone, melts at 144–156° and then solidifies again to small needles which melt again and finally at 184°.

In carrying out the process described in the preceding paragraph, the solvent which is employed may be replaced by an other solvent, such as dichlorethane or heptane.

*Example 2*

A boiling solution of 29.6 parts of $\Delta^{20,23}$-$3\alpha,12\alpha$-diacetoxy-24,24-diphenyl-choladiene in 400 parts by volume of pure, dry carbon tetrachloride is treated rapidly, while exposing to strong light from photo spot lamps, with a solution of 2.5 parts by volume of bromine in 50 parts by volume of carbon tetrachloride. The bromine is taken up at once and, immediately afterwards, a powerful evolution of hydrogen bromide takes place. After 10-20 minutes the reaction solution is evaporated in vacuum and the residue dissolved in isopropyl ether, whereby the $\Delta^{20,23}$-$3\alpha,12\alpha$-diacetoxy-21-bromo-24,24-diphenyl-choladiene of the formula

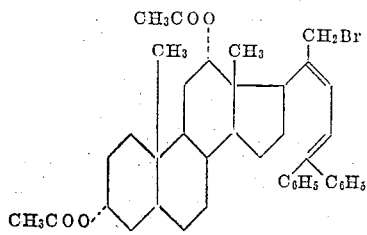

gradually crystallizes. The pure compound melts at 195-196°.

In strictly analogous manner other $\Delta^{20,23}$-$3\alpha,12\alpha$-diacetoxy-24,24-diphenyl-choladienes, e. g. $\Delta^{20,23}$-$3\alpha$-propionyloxy-12$\alpha$-benzoyloxy-24,24-diphenyl-choladiene, can be brominated in 21-position.

*Example 3*

Into a boiling solution of 28.6 parts of $\Delta^{23}$-$3\beta$-acetoxy-5-chloro-24,24-diphenyl-cholene in 400 parts by volume of pure, dry carbon tetrachloride, while exposing to light from a strong incandescent lamp, there are allowed to flow 2.55 parts by volume of dry, pure bromine dissolved in 80 parts by volume of pure, dry carbon tetrachloride. The bromine is taken up instantaneously and, immediately afterwards, hydrogen bromide commences to evolve. After addition of 20 parts by volume of glacial acetic acid the whole is boiled for a further 4-6 hours under reflux and subsequently evaporated in vacuum. The residue is recrystallized from isopropyl ether and yields the $\Delta^{20,23}$-$3\beta$-acetoxy-5-chloro-24,24-diphenyl-choladiene of the formula

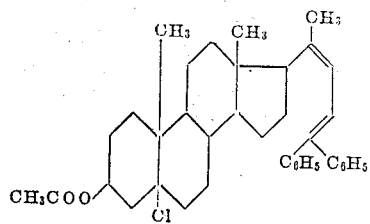

which melts at 196-199°.

If dimethyl aniline is allowed to react at 200° upon $\Delta^{20,23}$-$3\beta$-acetoxy-5-chloro-24,24-diphenyl-choladiene, there is obtained, after working up and recrystallization from isopropanol, $\Delta^{5,20,23}$-$3\beta$-acetoxy-24,24-diphenyl-cholatriene of the formula

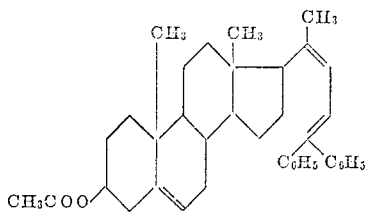

The pure compound melts at 171-175°.

*Example 4*

31.4 parts of $\Delta^{23}$-$3\alpha$-acetoxy-11-keto-12-bromo-24,24-diphenyl-cholene are dissolved in 400 parts by volume of pure, dry carbon tetrachloride. The solution is then heated to boiling, exposed to the light from a strong incandescent lamp, and a solution of 2.55 parts by volume of dry bromine in 50 parts by volume of pure, dry carbon tetrachloride run in. The bromine is taken up at once, and the boiling being continued, hydrogen bromide is evolved. Heating of the reaction mixture is continued until the evolution of hydrogen bromide ceases. The solvent is then evaporated off and the residue dissolved in acetone, whereupon the $\Delta^{20,23}$-$3\alpha$-acetoxy-11-keto-12-bromo-24,24-diphenyl-choladiene, which corresponds to the formula

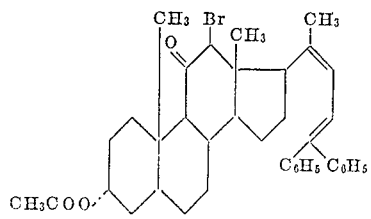

and which melts at 175-178°, crystallizes out.

*Example 5*

A solution of 31.5 parts of $\Delta^{23}$-$3\alpha$-acetoxy-11-keto-12-bromo-24,24-diphenyl-cholene in 400 parts by volume of pure, dry carbon tetrachloride is heated to boiling while being exposed to strong light, and brominated with 2.55 parts by volume of bromine, dissolved in 50 parts by volume of carbon tetrachloride. Boiling of the reaction solution is continued for several more hours until hydrogen bromide is completely split off and has escaped. Thereupon a further 2.55 parts by volume of bromine, dissolved in 50 parts by volume of carbon tetrachloride, are added to the reaction solution, the boiling and exposure of which to strong light being continued. Bromine absorption takes place forthwith and this is followed by a further evolution of hydrogen bromide. In about 10 to 20 minutes, the reaction solution is evaporated to dryness and hexane added to the residue, whereupon the $\Delta^{20,23}$-$3\alpha$-acetoxy-11-keto-12,21-dibromo-24,24-diphenyl-choladiene of the formula

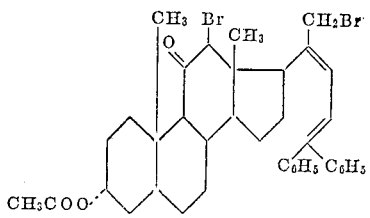

crystallizes out. This compound shows, in the ultraviolet spectrum a strong absorption band at about 3250 Å which is characteristic for diphenylcholadienes [see Meystre et al., Helvetica Chimica Acta, vol. 27, page 1820 (1944)].

The same end product is obtained if the second bromination is carried out with isolated pure $\Delta^{20,23}$-3$\alpha$-acetoxy-11-keto-12-bromo - 24,24-diphenyl-choladiene.

*Example 6*

25.5 parts of $\Delta^{20,23}$-3$\alpha$,9-epoxy-11-keto-24,24-diphenyl-choladiene are dissolved in 400 parts by volume of pure, dry carbon tetrachloride. The solution is heated to boiling while being simultaneously exposed to strong light, and a mixture of 2.55 parts by volume of bromine and 50 parts by volume of carbon tetrachloride is then added. The bromine is immediately taken up and, the boiling being continued, hydrogen bromide is evolved. After a boiling period of 15 to 30 minutes, the reaction solution is evaporated and the obtained residue taken up in hexane, whereupon the $\Delta^{20,23}$ - 3$\alpha$,9-epoxy - 11 - keto - 21-bromo-24,24-diphenyl-choladiene of the formula

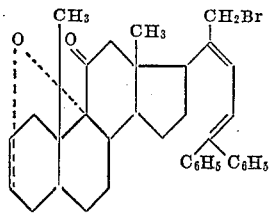

crystallizes out. The product melts unsharply between 230 and 250°, depending upon the speed of heating.

The $\Delta^{20,23}$-3$\alpha$,9-epoxy-11-keto-24,24 - diphenyl-chloladiene used as starting material in this example can be prepared, for example, from $\Delta^{23}$-3$\alpha$,9-epoxy - 11 - keto-24,24-diphenyl-cholene by first introducing a hydroxyl group in 22-position by the action of selenium dioxide in the presence of pyridine, and then splitting off water by means of glacial acetic acid which contains a little hydrogen bromide, whereby a double bond is introduced into the 20,22-position.

*Example 7*

A solution of 27.6 parts of $\Delta^{23}$-3$\alpha$-acetoxy-11-keto-24,24-diphenyl cholene in 400 parts by volume of dry pure ethylene chloride is heated to boiling while being subjected to the action of strong light, and 4 parts by volume of dry bromine, dissolved in 60 parts by volume of ethylene chloride, are added thereto. The boiling of the solution is continued for several hours, i. e. until the evolution of hydrogen bromide ceases, and the solution is then evaporated to dryness. The obtained $\Delta^{20,23}$-3$\alpha$ - acetoxy - 11 - keto - 24,24-diphenyl-choladiene of the formula

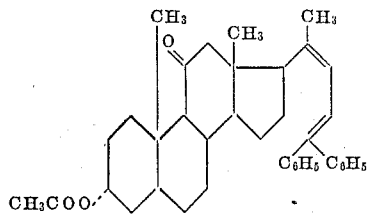

crystallizes out in either of two modifications, depending upon the solvent employed. From acetone or acetone-methanol mixture, spear-like crystals which melt at 107–112° are obtained. Recrystallization from methanol yields needles having a melting point of 169–170°.

*Example 8*

1 part of $\Delta^{23}$-3$\beta$-acetoxy-24,24-diphenyl-allo-cholene is dissolved in 50 parts by volume of carbon tetrachloride, and then 0.23 part of chlorobromine in 15 parts by volume of carbon tetrachloride is added dropwise within a period of 2 minutes to the solution at boiling temperature and while exposed to strong light. The boiling and exposure to light are continued for 5 more minutes. After cooling, the reaction solution is washed with water, dried and evaporated. By treating the residue with acetone, the $\Delta^{23}$-3$\beta$-acetoxy - 24,24 - diphenyl-allo-cholene-chlorobromide, which melts at 200–201° and is produced as a by-product, is crystallized out and is separated. The mother liquor thus obtained is evaporated to dryness and the residue is chromatographed on 30 parts of aluminum oxide. From the benzene petroleum ether-1:5-eluates, there is obtained the $\Delta^{20,23}$-3$\beta$-acetoxy - 24,24 - diphenyl-allo-choladiene of the formula

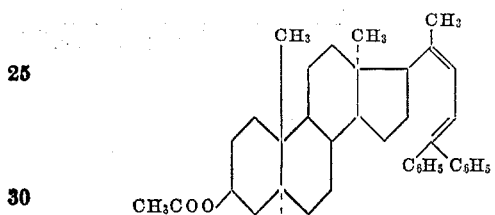

which melts at 150–151°.

What we claim is:

1. Process for the direct halogen-substitution of steroids, which comprises treating a steroid containing in 17-position a side chain with at least one double bond which is represented by a member of the group consisting of the radicals

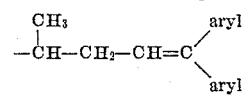

and

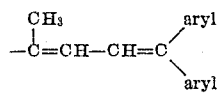

with bromine, while exposing the reactants to the action of strong light.

2. Process for the direct halogen-substitution of steroids, which comprises treating a $\Delta^{23}$-24,24-diphenyl-cholene with bromine, while exposing the reactants to the action of strong light, whereby the $\Delta^{23}$-22-bromo - 24,24 - diphenyl-cholene is formed.

3. Process for the direct halogen-substitution of steroids, which comprises treating a $\Delta^{20,23}$-24,24-diphenyl-choladiene with bromine, while exposing the reactants to the action of strong light, whereby the $\Delta^{20,23}$-21-bromo - 24,24 - diphenyl-choladiene is formed.

4. Process for the direct halogen-substitution of steroids and their dehalogenation products, which comprises treating a $\Delta^{23}$ - 24,24 - diaryl-cholene with bromine, while exposing the reactants to the action of strong light and treating the so-formed $\Delta^{23}$ - 22 - bromo - 24,24 - diaryl-cholene with a dehydrohalogenating agent.

5. Process for the direct halogen-substitution of steroids and their dehalogenation products, which comprises treating a $\Delta^{23}$ - 24,24 - diaryl-cholene with bromine, while exposing the reactants to the action of strong light and heating the so formed $\Delta^{23}$-22-bromo - 24,24 - diaryl-cholene, whereby the bromine atom of the so formed 22-bromine compound is split off as hydrogen bromide.

6. Process for the direct halogen-substitution of steroids and their dehalogenation products, which comprises treating a $\Delta^{23}$ - 24,24 - diphenyl-cholene with bromine, while exposing the reactants to strong light, and heating the so formed $\Delta^{23}$-22-bromo - 24,24 - diphenyl-cholene, whereby the bromine atom in 22-position is split off as hydrogen bromide.

7. Process for the direct halogen-substitution of steroids and their dehalogenation products, which comprises treating a $\Delta^{23}$ - 24,24 - diaryl-cholene with bromine, while exposing the reactants to the action of strong light, then heating the reaction mixture, whereby the bromine atom of the so formed 22-bromine compound is split off as hydrogen bromide, and again treating the reaction mixture with bromine, while exposing it to the action of strong light, whereby the 21-bromo-$\Delta^{20,23}$-choladiene is formed.

8. Process for the direct halogen-substitution of steroids and their dehalogenation products, which comprises treating a $\Delta^{23}$ - 24,24 - diphenyl-cholene with bromine, while exposing the reactants to the action of strong light, then heating the reaction mixture, whereby the bromine atom of the so formed 22-bromo compound is split off as hydrogen bromide, and again treating the reaction mixture with bromine, while exposing it to the action of light, whereby the 21-bromo-$\Delta^{20,23}$-choladiene is formed.

KARL MIESCHER.
LUDWIG EHMANN.
ALBERT WETTSTEIN.

REFERENCES CITED

The following references are of record in the file of this patent:

UNITED STATES PATENTS

| Number | Name | Date |
|---|---|---|
| 2,461,912 | Miescher | Feb. 15, 1949 |

FOREIGN PATENTS

| Number | Country | Date |
|---|---|---|
| 544,051 | Great Britain | Mar. 25, 1942 |